UNITED STATES PATENT OFFICE.

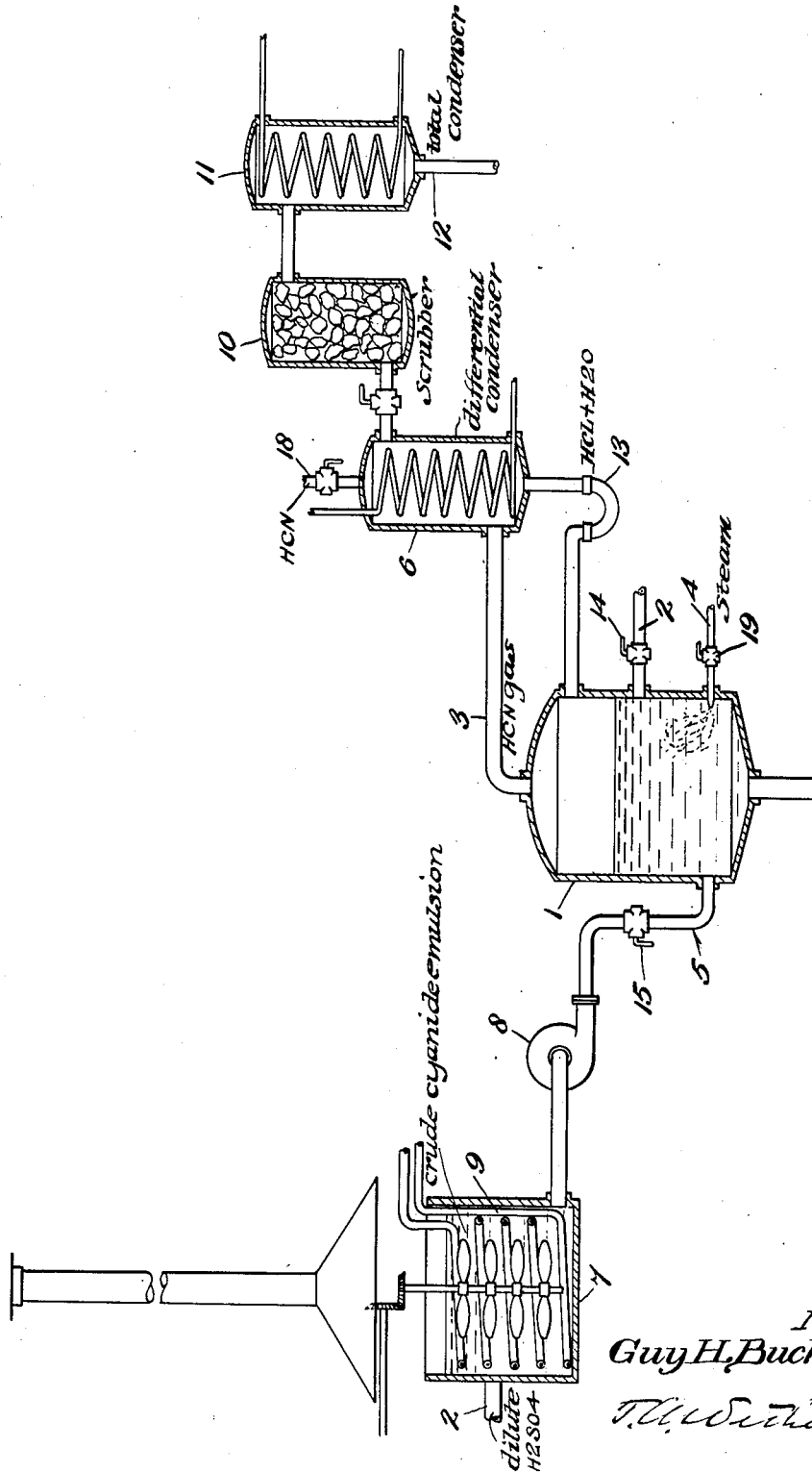

GUY H. BUCHANAN, OF ROSELLE, NEW JERSEY, ASSIGNOR TO AMERICAN CYANAMID COMPANY, OF NEW YORK, N. Y., A CORPORATION OF MAINE.

PROCESS OF RECOVERING HYDROCYANIC ACID.

1,355,384. Specification of Letters Patent. Patented Oct. 12, 1920.

Application filed November 12, 1919. Serial No. 337,469.

*To all whom it may concern:*

Be it known that I, GUY H. BUCHANAN, a citizen of the United States, residing at Roselle, in the county of Union and State of New Jersey, have invented certain new and useful Improvements in Processes of Recovering Hydrocyanic Acid; and I do hereby declare the following to be a full, clear, and exact description of the invention, such as will enable others skilled in the art to which it appertains to make and use the same.

This invention relates to a process of recovering high grade hydrocyanic acid from a crude form of cyanid, and has for its objects to provide a method of obtaining such high grade product from low grade raw materials which will be more efficient and less costly than those heretofore proposed.

With these and other objects in view the invention consists in the novel steps and combinations of steps constituting the process, all as will be more fully hereinafter disclosed and particularly pointed out in the claims.

The process of this application may be said to be a modification of that disclosed in my copending application #337468, filed November 12, 1919, and entitled Method of producing hydrocyanic acid.

The figure of the accompanying drawing, forming a part of this specification, is a diagrammatic view of one form of apparatus suitable for carrying out the process.

In order that the precise invention may be the more clearly understood it is said:—

It is well known in the art that when the ordinary sodium or potassium cyanid of commerce, containing say 96 to 98% of the corresponding cyanid, is treated with a strong mineral acid, hydrocyanic acid is evolved and a corresponding sodium or potassium salt of the mineral acid used is left behind in the residue. For instance if sodium cyanid and sulfuric acid are employed, the reaction takes place acording to the well known equation—

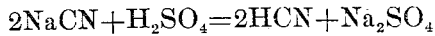

I have carried out this reaction on a large scale, wherein there was employed for the production of hydrocyanic acid a small amount of water which was run into a generator and then 66° acid was added in quantities equivalent to the sodium cyanid to be charged. The purpose of the water was largely to heat up the acid to a high temperature. Pure sodium cyanid dissolves in water in the proportions of one part of cyanid to two parts of water, and such a solution may be run into the acid fairly rapidly. The resulting hydrocyanic acid gas is evolved rapidly, and at the close of the operation the contents of the generator are discharged. This procedure showed a consecutive recovery over many months operation of around 80% of the theoretical quantity to be expected from the pure cyanid. The residue was highly acid and smelled strongly of hydrocyanic acid gas.

In carrying out the process of my Patent #1317755, on the other hand, I was confronted with the problem of using a new and impure form of cyanid which contained approximately 19% of cyanogen equivalent to 35% of sodium cyanid, about 40% of calcium chlorid about 5% of sodium chlorid, about 15% of lime and 5% of miscellaneous impurities which play no essential part in the operation. In attempting to utilize this material in the same manner as pure cyanid, I encountered the difficulty of being unable to make a solution of this impure cyanid of the same strength as that used with the pure material. Further, this extremely strong solution heated up so much in its making that it was very unstable. I, therefore, was forced to change the above process employing a pure cyanid, when it came to operating under my said patent, for I found it necessary to first charge the generator with water, then to add the flake cyanid, and finally to introduce sulfuric acid of 60° strength under the surface of the liquid.

In this latter method I was enabled to utilize the said crude cyanid in a fairly satisfactory manner, for I obtained on large scale work and over a large period of time, recoveries as high as 85% and, in experimental work under careful control, recoveries of between 90 and 95%. I, however, found that to obtain the most satisfactory results with this said patented method, I was practically limited to the use of say 60° sulfuric acid as the introduction of a stronger acid into the flake cyanid resulted in a lower efficiency as well as more difficult operation.

The use of 60° or a stronger acid in the generator seems to cause a decomposition of either the sodium cyanid or of the hydrocyanic acid with the resulting lowering of the efficiency.

According to the present invention, I have modified my earlier procedure along the following lines:—I make an emulsion of crude cyanid and water using one part of crude cyanid to three or four parts of water, and during the dissolving action I agitate the mixture and apply an energetic cooling. By these means I am enabled to make a dilute solution of the soluble portion of crude cyanid and by keeping the temperature below 100° F. I find that the decomposition of the cyanid is negligible within the time required for the operation.

Therefore, in carrying out this invention, I charge into a generator a dilute solution of sulfuric acid running between say 30 to 40% and preferably only about 35% strength. Into this solution of acid I run my emulsion of crude cyanid. The sulfuric acid present decomposes the cyanid into hydrocyanic acid, but on account of the very great dilution in the generator, very little hydrocyanic acid is evolved as the two solutions of acid and emulsion mix. I proportion the quantity of sulfuric acid to the crude cyanid so that by the time the solutions are finally brought together, I have added a slight excess of sulfuric acid over that theoretically necessary to decompose the cyanid.

It is true that during the introduction of the cyanid solutions there is an excess of sulfuric acid present. Undoubtedly this reacts upon some of the chlorids present to form hydrochloric acid, but on account of the great dilution of the solution, and the fact that at no time does the mixture rise to boiling, this hydrochloric acid remains in solution, reacting with the cyanid as fast as it is charged and practically none of it is evolved as a gas.

After the solutions have been thus brought together, I introduce live steam directly into the mass and bring the temperature up gradually. By the time I have reached 160° F. practically all the hydrocyanid acid gas as boiled out of the solution but no hydrochloric acid, or at least only very slight traces are evolved at these low temperatures. By the use of a rectifying column or a scrubbing tower, or both, I eliminate the very slight traces of hydrochloric acid, if any, from the hydrocyanic acid which goes over, and therefore, I obtain a very pure product from a crude cyanid.

Referring to the accompanying drawing, 1 represents a generator consisting of a closed acid proof apparatus provided with a valved inlet tube 2, for introducing water and sulfuric acid preferably in a premixed condition. 3 is an outlet for the evolved hydrocyanic acid gas. 4 is a valved inlet for the steam. 5 is an inlet for the crude cyanid emulsion, which may be made up in an agitating tank 7, provided with cooling coils 9. 8 represents a pump for the delivery of the emulsion from the agitating tank 7 to the generator 1. On the outlet side of tank 1 I provide a differential condenser 6 and a scrubbing tower 10.

Connected with tower 10 is the total condenser 11 which condenses the product and 12 represents an outlet for the latter. Connecting the differential condenser 6 and the generator 1 is the siphoned pipe 13 for returning the water and other impurities extracted in said differential condenser.

The operation of this apparatus is as follows:—Into the generator 1 I run a measured quantity of dilute sulfuric acid through pipe 2, and close the valve 14. I then pump in a measured quantity of crude cyanid emulsion through pipe 5 and close the valve 15 on this line. Little or no gas is evolved during this mixing. I then inject steam through pipe 4 and as the mass in the generator is heated up hydrocyanic acid gas is evolved. This latter passes up through pipe 3 to the differential condenser 6 where it meets with a cool surface, condensing any water vapor that may be carried along with it, which water vapor picks up any hydrochloric acid present and through pipe 13 returns the same to the generator 1. As a result of this procedure and by the use of a simple differential condenser, I have made many hundreds of pounds of hydrocyanic acid from a crude cyanid, containing much less than one one-hundredth of one per cent. of hydrochloric acid, and in fact the merest of traces in most cases. Such acid may be removed through the pipe 18 if desired.

For a still purer gas the limestone scrubber 10 attached to the differential condenser is used to take out the very last traces of hydrochloric acid.

By this system of operation it is readily seen that I am enabled to use almost any strength of commercial sulfuric acid by merely diluting the same to a lower percentage in the generator. This is of marked advantage in fumigating orange trees, for such fumigation is frequently carried on in places where it is difficult to obtain a particular strength of mineral acid, to make the fumigating acid; and further, it is not usual to transport anhydrous hydrocyanic acid by railway, so the manufacturing plant must be located near the point of consumption, which is usually not well supplied with different strengths of sulfuric acid. In addition to the above, the use of the very dilute acid solution enables the transformation of cyanid into hydrocyanic acid without any decomposition of the hydrocyanic acid by contact with strong sulfuric acid. I, therefore, obtain very high yields by this method. In fact, an efficiency of from 96 to 98% is regularly attained in practice.

This method further has the advantage of not evolving enormous quantities of hydrocyanic acid gas immediately on contact of the two solutions, as is the case in former methods. The evolution of gas follows the rise in temperature of the solution in the generator and is therefore absolutely under control by manipulation of the steam valve 19. I am accordingly enabled to use considerably smaller condensers and to pump less refrigerating medium than is the case where one must handle the excessive peak discharge of my prior method.

It is obvious that those skilled in the art may vary the details of the procedure without departing from the spirit of the invention, and therefore, I do not wish to be limited to the above disclosure except as may be required by the claims.

What I claim is:—

1. The process of producing hydrocyanic acid which consists in mixing an emulsion with water of an impure cyanid containing substantially 40% calcium chlorid and 15% lime with a dilute solution of a mineral acid; subjecting the mixture to the action of heat and suitably recovering the evolved gas, substantially as described.

2. The process of producing hydrocyanic acid from crude cyanids containing substantial percentages of calcium chlorid, lime and other impurities which consists in mixing an emulsion of said cyanid and water with a dilute solution of sulfuric acid; subjecting the mixture to the action of heat until substantially all the evolved hydrocyanic acid gas leaves said mixture; and passing the said evolved gas to a suitable recovering apparatus, substantially as described.

3. The process of producing hydrocyanic acid from crude cyanids containing substantial percentages of calcium chlorid, lime and other impurities which consists in mixing a dilute solution of said cyanid with a dilute solution of sulfuric acid; subjecting the mixture to the action of steam, until substantially all the evolved hydrocyanic acid gas leaves said mixture; passing the evolved gas first through a differential condenser to remove any hydrochloric acid and water vapor that may be present and then through a total condenser for the purpose of recovering the hydrocyanic acid, substantially as described.

4. The process of producing hydrocyanic acid from crude cyanids containing substantial percentages of calcium chlorid, lime and other impurities which consists in adding a dilute solution of said cyanid to a dilute solution of sulfuric acid; subjecting the mixture to the direct action of steam until substantially all the evolved hydrocyanic acid leaves said mixture; passing the evolved gas through a differential condenser; passing said gas through a scrubber; and finally passing said gas through a total condenser for the purpose of recovering substantially pure hydrocyanic acid, substantially as described.

5. The process of producing hydrocyanic acid from crude cyanids containing substantial percentages of calcium chlorid, lime and other impurities which consists in adding an emulsion of said cyanid containing substantially one part of cyanid to substantially more than two and a half parts of water to dilute sulfuric acid of a strength between 30 and 50%; subjecting the mixture to the direct action of steam to drive off the hydrocyanic acid gas; and passing the evolved gas through a differential condenser provided with a reflux means, substantially as described.

6. The process of producing hydrocyanic acid from crude cyanids containing substantial percentages of impurities which consist in adding a solution of said cyanid containing one part of cyanid to more than three parts of water to dilute sulfuric acid of between 30 and 45% strength; subjecting the mixture to the direct action of steam; passing the evolved gas through a differential condenser provided with reflux means; thence passing said gas through a scrubber; and thence passing said gas through a total condenser for the purpose of recovering hydrocyanic acid, substantially as described.

In testimony whereof I affix my signature.

GUY H. BUCHANAN.